United States Patent
Desai et al.

(10) Patent No.: US 6,467,391 B2
(45) Date of Patent: Oct. 22, 2002

(54) HYDRAULIC DEVICE WITH ANTI-STICTION FEATURES

(75) Inventors: Chetan J. Desai; Xinshuang Nan, both of Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/740,696

(22) Filed: Dec. 19, 2000

(65) Prior Publication Data

US 2002/0073841 A1 Jun. 20, 2002

(51) Int. Cl.[7] .......................... F15B 13/04; F02M 63/00
(52) U.S. Cl. ...................................... 91/398; 239/533.2
(58) Field of Search ................... 91/392, 398; 92/85 R, 92/85 B; 239/533.2

(56) References Cited

U.S. PATENT DOCUMENTS

| | | | | |
|---|---|---|---|---|
| 2,219,229 A | * | 10/1940 | Kalin | 91/366 |
| 2,478,183 A | * | 8/1949 | Drake | 60/413 |
| 2,734,490 A | * | 2/1956 | Moulton | 91/398 |
| 5,375,576 A | | 12/1994 | Ausman et al. | |
| 5,492,098 A | | 2/1996 | Hafner et al. | |
| 5,517,972 A | | 5/1996 | Stockner | |
| 5,522,545 A | | 6/1996 | Camplin et al. | |
| 5,687,693 A | | 11/1997 | Chen et al. | |
| 5,887,790 A | | 3/1999 | Flinn | |

OTHER PUBLICATIONS

Application of Digital Valve Technology to Diesel Fuel Injection, 1999–01–0196, C. Cole, O.E. Sturman, D Giodano.

* cited by examiner

Primary Examiner—Edward K. Look
Assistant Examiner—Michael Leslie
(74) Attorney, Agent, or Firm—Liell & McNeil

(57) ABSTRACT

In hydraulically actuated fuel injectors that utilize lubricating oil as the actuation fluid, various components within the injector body must move relatively short distances at high rates of speed in a wetted oil environment. When the oil is at a relatively low temperature, its relatively high viscosity coupled with relatively small size of these components can cause stiction problems to occur. Stiction occurs where the moveable component comes in contact with the body when it rests against its stop. The highly viscous oil can tend to cause the component to resist breaking free of its stop surface such that the fuel injector may be inhibited in performing adequately, especially during cold start conditions. These potential stiction problems are reduced by including a raised surface feature on one or both of the component and body in order to reduce the potential contact surface area.

10 Claims, 4 Drawing Sheets

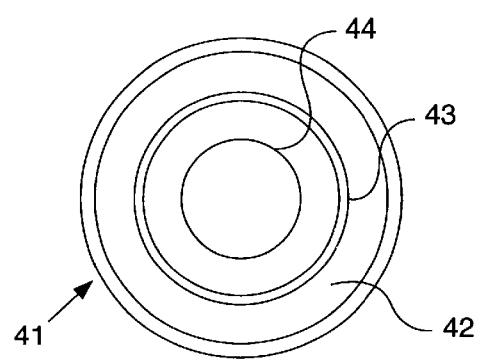
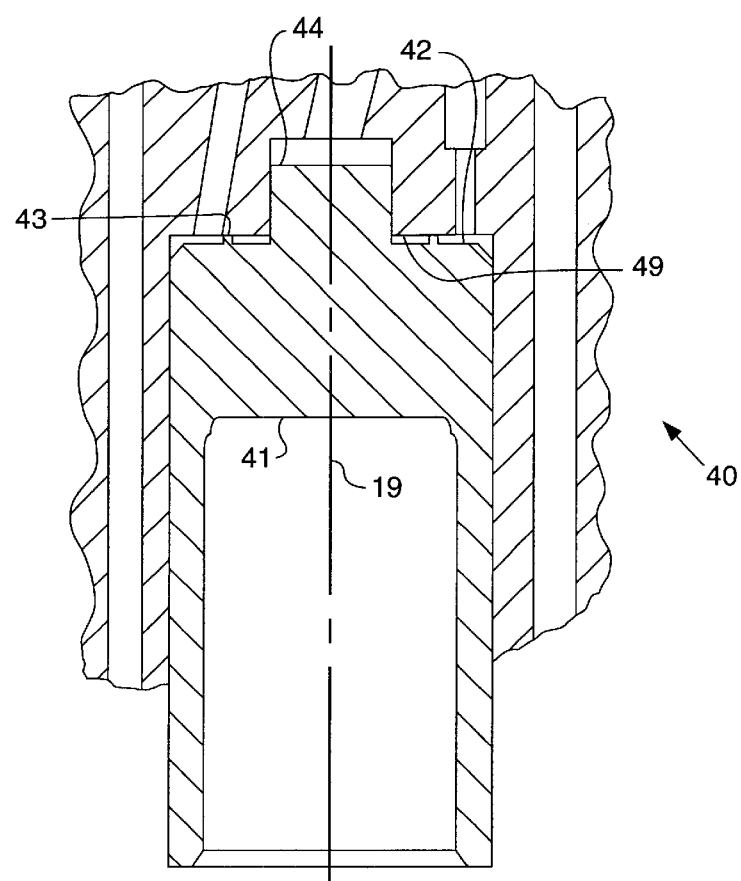

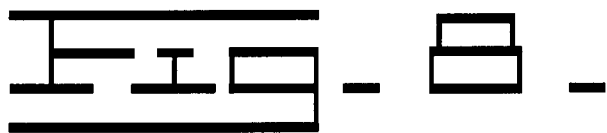
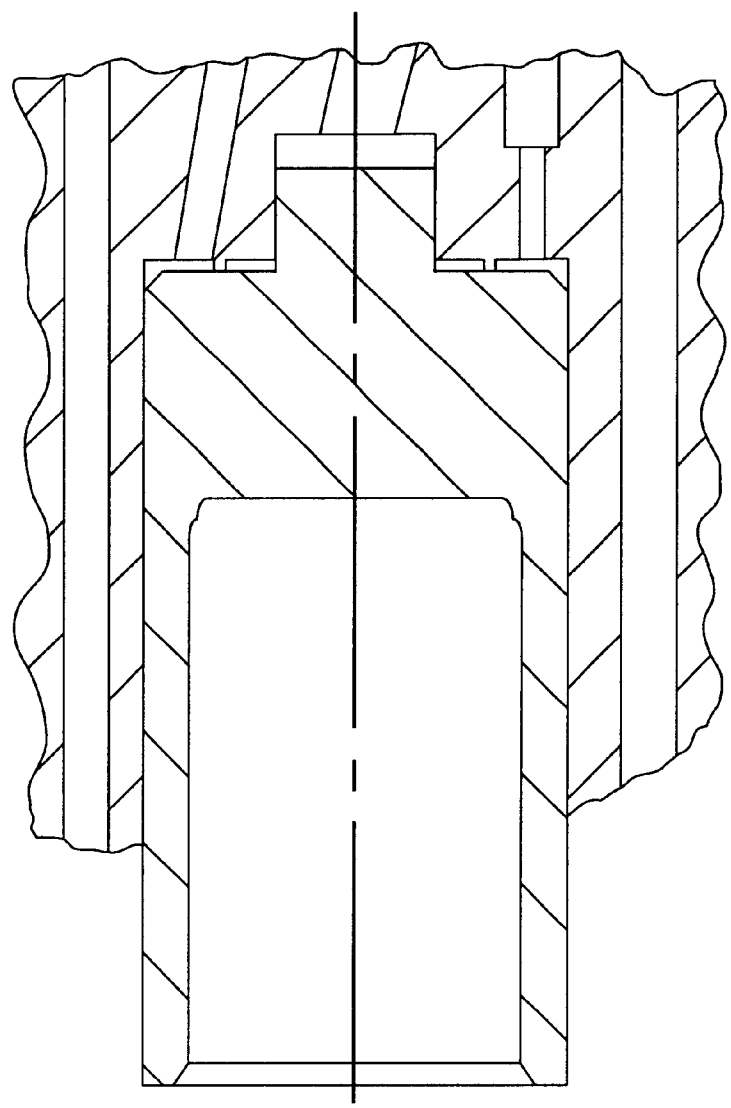

HYDRAULIC DEVICE WITH ANTI-STICTION FEATURES

TECHNICAL FIELD

The present invention relates generally to hydraulic devices, and more particularly to the inclusion of an anti-stiction feature between a moveable component and body of a hydraulic device.

BACKGROUND ART

Many hydraulic devices include a hydraulically driven piston assembly, which in its most basic form is made up of a barrel and a movable piston. In many instances, including hydraulic systems associated with internal combustion engines, the hydraulically driven pistons must have the ability to operate over a wide range of temperatures. In some cases, such as when the actuating fluid is engine lubricating oil or the like, the fluid can become extremely viscous toward the low temperature operating range of the hydraulic device. For instance, in the case of hydraulically actuated fuel injectors, the devices should have the ability to operate at relatively low temperatures, such as when the engine is undergoing a cold start.

In those cases where a large portion of the piston hydraulic surface comes in contact with the barrel when in its retracted position, a sticking phenomenon can occur, and acts to inhibit or delay the ability of the piston to break free even in the presence of high pressure actuation fluid. In other words, a relatively thin but highly viscous fluid layer between the piston and the barrel can cause the piston to resist breaking free to perform an activation event, such as pressurizing and injecting fuel in the case of a hydraulically actuated fuel injector. The result of this phenomenon is to require excessive and sometimes annoying engine cranking before the pistons within the fuel injectors can break free and cause fuel to be injected in order to start the engine.

In addition to potential sticking problems associated with intensifier pistons in hydraulically actuated fuel injectors, potential sticking can also occur at other locations within such fuel injectors. For instance, if the fuel injector includes a direct control needle that includes a needle piston exposed on one side to oil, movement of the needle piston can become sluggish and/or briefly stuck when it comes in contact with its stop. In addition, some fuel injectors of this type include a pilot operated control valve that may include a ball and pin pilot valve operably coupled to a spool valve member. Because the spool valve in many of these control valve assemblies is hydraulically driven and comes in contact with a stop surface, its performance can also become sluggish and/or become stuck against its stop surface. Finally, in the case of a ball and pin pilot valve, the armature of a solenoid that is coupled to the pilot valve ball and pin can have a position where it comes in contact with a stop. If the area in and around the armature is wetted with oil, the same sticking and/or sluggish response behavior can again reveal itself.

Although hydraulic systems have long been known in many different art fields, it is believed that the problem of sluggish performance and/or sticking primarily only occurs in hydraulic systems, such as fuel injectors, that include relatively small, light weight components that move within a body over relatively small distances, and must move very quickly for the device to perform properly.

The present invention is directed to these and other problems associated with component sticking in relatively high viscous environments.

DISCLOSURE OF THE INVENTION

In one aspect, a hydraulic device includes a body with a first surface and a component with a second surface moveably positioned in the body. In a first position, the component is in contact with the first surface of the body over a contact area. In a second position, the first surface is out of contact with the second surface. An improvement includes making the contact area a portion of at least one thin raised surface feature on one of body and the component.

In another aspect, a hydraulic device includes a body and a component moveably positioned in the body. A separator is in contact over a contact area with at least one of the body and the component when the component is a retracted position. The separator is out of contact with at least one of the body and the component when the component is away from its retracted position. A contact area is a portion of a substantially smooth surface on one of the body and the component. The contact area is located away from the centerline and/or less than 15% of the area of the substantially smooth surface.

In still another aspect, a method of reducing sticking in a hydraulic device includes a step of providing a body with a movable component therein. The component has a second surface in contact over a contact area with a first surface of the body when in a first position. When in a second position, the first surface is out of contact with the second surface. One of the first surface and the second surface are positioned atop a raised surface feature, and the other of the first surface and the second surface is part of a substantially smooth surface. The contact area is sized and arranged to be at least one of thin and/or less than 15% of an area of the substantially smooth surface.

BRIEF DESCRIPTION OF THE DRAWINGS

FIG. 2 is an enlarged sectioned side diagrammatic view of the intensifier piston portion of the fuel injector of FIG. 1;

FIG. 3 is a top diagrammatic view of the intensifier piston shown in FIG. 2;

FIG. 8 is an enlarged sectioned side diagrammatic view of an intensifier piston portion of a fuel injector according to another aspect of the present invention.

BEST MODE FOR CARRYING OUT THE INVENTION

Figure 1:
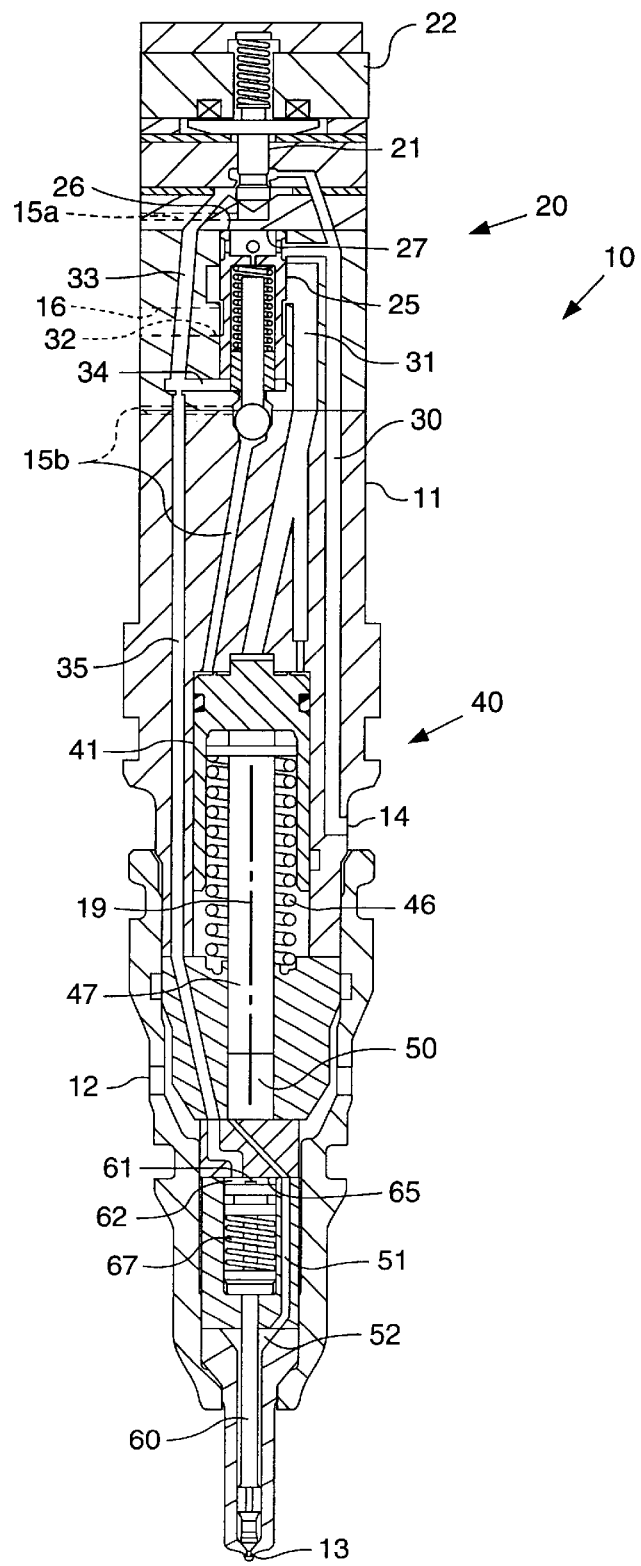
FIG. 1 is a sectioned side diagrammatic view of a hydraulically actuated fuel injector according to one aspect of the present invention.

Referring to FIG. 1, a hydraulically actuated fuel injector 10 is shown with several internal components that include the anti-stiction features of the present invention. Fuel injector 10 provides an injector body 11 made up of various machined metallic components attached to one another in a manner well known in art. In addition, fuel injector 10 provides a number of internal moveable components that are positioned as they would be just prior to the initiation of an injection event. The injector body 11 defines a fuel inlet 12 that would be connected to a suitable source of fuel, such a distillate diesel fuel, and a nozzle outlet 13 that would preferably be positioned in the combustion space of an internal combustion engine in a known manner. In addition, injector body 11 defines an actuation fluid inlet 14, which would preferably be connected to a source of high pressure engine lubricating oil. Injector body 11 also defines a first vent 15a, a second vent 15b and a drain 16 that would be preferably fluidly connected to an appropriate low pressure reservoir, such as an engine oil pan.

The operation of fuel injector 10 is controlled by a control valve 20 that includes a pilot valve member 21 and a spool valve member 25. Pilot valve member 21 is preferably connected to a suitable electrical actuator 22, such as a solenoid or a piezo electric actuator. Pilot valve member 21 is normally biased to a downward position that closes a low pressure seat. When energized, electrical actuator 22 pulls pilot valve member 21 upward to close a high pressure seat. The up or down positioning of pilot valve member 21 controls whether low or high pressure exists in a spool control passage 34 that acts upon the underside of spool valve member 25.

Figure 4:
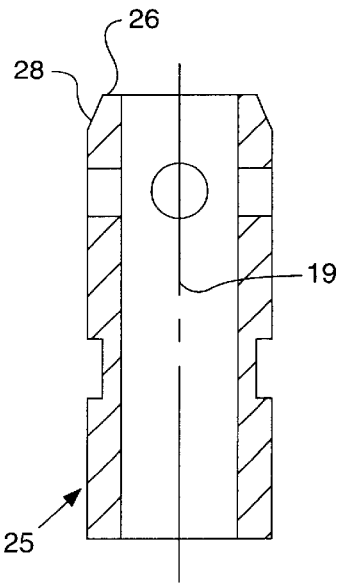
FIG. 4 is a sectioned side diagrammatic view of the spool valve member in the fuel injector of FIG. 1 according to another aspect of the invention.

Spool valve member 25 in normally biased toward its upward position, as shown, in which its top hydraulic surface 26 is in contact with a substantially smooth stop surface 27. Top hydraulic surface 26 is always exposed to high pressure actuation fluid via at least one radial passage defined by spool valve member 25 that connect to high pressure passage 30. Thus, the first location within fuel injector 10 where potential stiction problems can occur is the contact area where hydraulic surface 26 contacts stop surface 27. In order to reduce this contact area, spool valve member 25 provides a raised annular ridge that is manufactured by machining an annular chamfer 28 (see FIG. 4) so that a substantial portion of hydraulic surface 26 is a frusto-conecal shaped surface that never comes in contact with stop surface 27.

When actuator 22 is de-energized, pilot valve member 21 is biased toward a downward position in which variable pressure control passage 33 and spool control passage 34 are fluidly connected to high pressure passage 30 when this occurs, spool valve member 25 is hydraulically balanced and remains in its upward biased position under the action of an internal biasing spring. When actuator 22 is energized, pilot valve member 21 lifts to a position that closes its high pressure seat and opens a low pressure seat so that variable pressure control passage 33 and spool control passage 34 are then connected to low pressure vent 15a. When this occurs, the continuous high pressure acting on hydraulic surface 26 overcomes the spring and the spool valve member 25 moves downward to a position that fluidly connects variable pressure passage 31 to high pressure passage 30. When in its upward position, variable pressure passage 31 is fluidly connected to drain 16 via a low pressure drain passage 32.

When variable pressure passage 31 is fluidly connected to high pressure passage 30 via a downward positioning of spool valve member 25, high pressure oil can flow to the piston and barrel assembly 40 of fuel injector 10. Referring in addition to FIGS. 2 and 3, the piston and barrel assembly 40 includes an intensifier piston 41 that is moveable between a retracted position, as shown, an a downward advanced position. Intensifier piston 41 includes a hydraulic surface 42 that includes a ring shaped ridge 43 and a top hat 44. Between injection events, a return spring 46 normally biases intensifier piston 41 to its upward position in which ring shaped ridge 43 is in contact with a substantially smooth stop surface 49. The contact area between hydraulic surface 42 and stop surface 49 is best shown in the top view of intensifier piston 41 illustrated in FIG. 3. This contact area has a relatively thin ring shape that is located away from centerline 19. Thus, ring shaped ridge 43, which preferably has a width equal to its height, acts as a separator positioned between piston 41 and stop surface 49. It should also be noted that in this version of the invention, the top of ring shaped ridge 43, or the contact area, is a portion of hydraulic surface 42. Those skilled in the art will appreciate that it is more likely an easier process to machine a raised surface feature, such as ring shaped ridge 43, on the moveable component (piston 41), rather than machining a raised surface feature on the body, such as on stop surface 49. Nevertheless, the present invention contemplates a raised surface feature on one or both of the body and moveable component in order to provide a reduced contact area to reduce potential stiction problems.

When intensifier piston 41 is hydraulically driven downward, it pushes a plunger 47 downward with it to pressurize fuel in a fuel pressurization chamber 50. Chamber 50 communicates with a nozzle chamber 52 via a nozzle supply passage 51. When a direct control needle 60 lifts to its upward open position, then high pressure fuel in nozzle chamber 52 can exit fuel injector 10 through nozzle outlet 13. Direct control needle 60 provides a needle piston 61 that has a hydraulic surface 63 exposed to fluid pressure in a needle control chamber 62. Needle control chamber 62 is fluidly connected to variable pressure control passage 33 via a needle control passage 35. Needle piston 61 is biased upward by a spring 67 to a position in contact with a stop surface 65, that is a portion of injector body 11. In order to reduce the contact area between needle piston 61 and stop surface 65, piston 61 provides a raised surface feature, which in this case is a post 64 that located in the center of hydraulic surface 63. Thus, the top of post 64 is a portion of hydraulic surface 63. In addition, in order to gain the substantial reduction in stiction problems, the contact area between post 64 and stop surface 65 is preferably less than about 15% of the entire hydraulic surface area 63. Both stop surface 65 and hydraulic surface 63 are both substantially smooth surfaces that could result in substantial stiction problems if their entire surface areas were allowed to come in contact.

Direct control needle valve 60 can move to its upward open position when pressure in needle control chamber 62 is low and fuel pressure in nozzle chamber 52 is relatively high. The various surface areas and planned usage fluid pressures are preferably such that direct control needle valve 60 will be held in its downward closed position, even in the presence of high fuel pressure in nozzle chamber 52, when high pressure prevails in needle control chamber 62.

Figure 5:
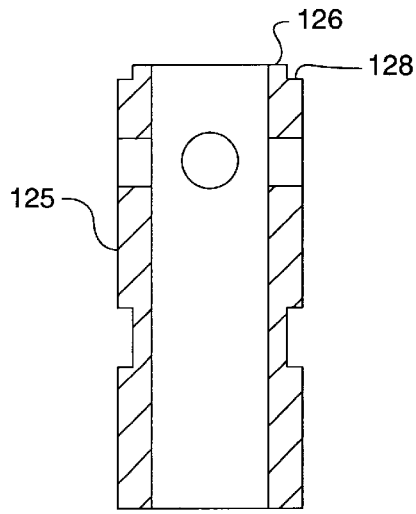
FIG. 5 is a sectioned side view of a spool valve member according to another aspect of the present invention.

Referring to FIG. 5, a spool valve member 125 according to an alternative embodiment of the present invention is illustrated. This spool valve member differs from spool member 25 shown in FIGS. 1 and 4 by the fact that the raised surface feature portion of hydraulic surface 126 is created by machining an annular relief 128 around the top ridge of the spool valve member. Those skilled in the art will appreciate that the top end of the spool valve member can take on a wide variety of shapes and still include a raised surface feature according to the present invention that reduces the contact area between the spool and its stop surface in order to reduce potential stiction problems.

Figure 7:
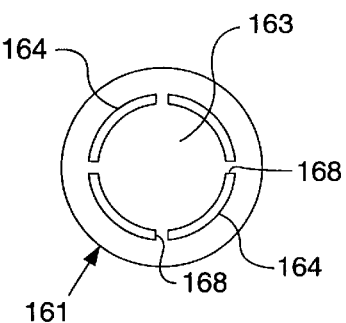
FIG. 7 is a top diagrammatic view of a needle piston according to another aspect of the present invention.
Figure 6:
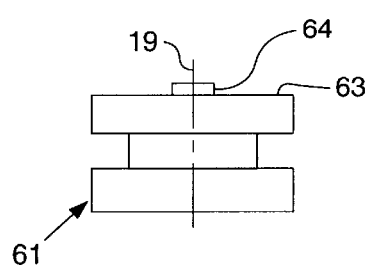
FIG. 6 is a side diagrammatic view of the needle piston portion of the fuel injector of FIG. 1.

Referring to FIG. 7, the top view of a needle piston 161 is illustrated as an alternative to the needle piston 61 shown in FIGS. 1 and 6. In this embodiment, the raised surface feature is a ring shaped ridge 164 with a plurality of notches removed in order to better facilitate the flow of fluid to the central portion when the piston is in contact with its stop surface.

Industrial Applicability

The anti-stiction features of the present invention find potential application in any hydraulic device in which a moveable component that is wetted with a highly viscous fluid comes in contact with the body of the device. However, potential stiction problems appear to be most acute in hydraulic devices in which the moveable component moves a relatively short distance, is required to move relatively quickly, and has mass properties that are relatively low. Thus, the present invention finds a preferred application in the various moveable components within hydraulically actuated fuel injectors and/or hydraulically actuated gas exchange valves that require relatively small light weight moveable components to move relatively short distance at extremely fast rates in the presence of what can be very highly viscous oil.

While the present invention has been illustrated as preferably including a raised annular ridge on the moveable component, those skilled in the art will appreciate that the raised surface feature could be located on the body component as shown in FIG. 8, or both pieces. However, it is believed to be easier to manufacture the raised surface feature on the external surface of the moveable component, rather than on an internal surface deep within a body piece. The raised surface feature of the present invention is also preferably located away from the centerline, as it is believed to be easier to machine a relatively thin raised ridge away from the centerline using a lathing procedure rather than machining a raised surface feature close to the centerline where the lath rotation speeds are relatively low.

The shape of the contact area according to the present invention is preferably relatively thin. It is believed that this thin shape allows for the creation of sheer forces to aid in breaking the component free from contact with the body piece. Thus, the preferred shape of the contact area is thin; however, the present invention can also take the form of a post shape aligned with a centerline such as shown with regard to the needle piston 61 of FIG. 6. However, in order to reduce potential stiction to acceptable levels, the contact area is preferably less than 15% of the total hydraulic surface area. Although the raised surface features illustrated in the preferred embodiments are all concentric with the centerline of the component, the present invention also contemplates raised surface features that do not have this symmetry. For instance, one alternative might be the inclusion of a plurality of raised button shapes anywhere on the hydraulic surface area. The present invention also contemplates the possibility of including a separate piece or separator between the body and the moveable component. For instance, such as in the case of an intensifier piston with a top hat as shown in FIG. 2, the inclusion of a small diameter wire connected to the top hat but resting against the hydraulic surface 42 could provide the means of reducing contact and associated stiction problems associated with large contact areas. Thus, the relatively thin raised ridge of the preferred version of the present invention could take the form of a separate wire or other piece properly positioned between the moveable component and the body. In addition, still another alternative might be to mount pins in one or the other of the moveable component and the body in order for the contact to occur at the really relatively small surface area of the pins rather than over a large potential contact area between a hydraulic surface and a stop surface.

Thus, those skilled in the art will appreciate that other aspects and features of the present invention can be obtained from a study of the drawings, the disclosure, and the appended claims.

What is claimed is:

1. A fuel injector including a body with a stop surface, and a hydraulically driven component with a hydraulic surface moveably positioned in the body between a first position in which said stop surface is in contact with said hydraulic surface over a contact area and a second position in which the stop surface is out of contact with the hydraulic surface, the improvement comprising:

said contact area being a portion of at least one raised surface feature on one of the body and the hydraulically driven component and located away from a centerline of said hydraulically driven component.

2. The fuel injector of claim 1 wherein said contact area has a thin shape.

3. The fuel injector of claim 1 wherein said raised surface feature includes a ring shaped ridge.

4. The fuel injector of claim 3 wherein said raised surface feature has a height and width that are about equal.

5. The fuel injector of claim 1 wherein said raised surface feature is on said hydraulically driven component.

6. The fuel injector of claim 5 wherein said contact area has a thin shape.

7. The fuel injector of claim 6 wherein said raised surface feature includes at least a portion of a ring shaped ridge.

8. A method of reducing sticking in a fuel injector, comprising the steps of:

providing a fuel injector including a body with a stop surface, and a hydraulically driven component with a hydraulic surface moveably positioned in the body between a first position in which said stop surface is in contact with a portion of said hydraulic surface over a contact area and a second position in which the stop surface is out of contact with the hydraulic surface;

positioning the contact area atop a raised surface feature on one of the body and the hydraulically driven component; and locating the contact area away from a centerline of said hydraulically driven component.

9. The method of claim 8 including a step of shaping the contact area to be thin.

10. The method of claim 8 including a step of machining a ring shaped ridge on the component.

* * * * *